Figure 1:
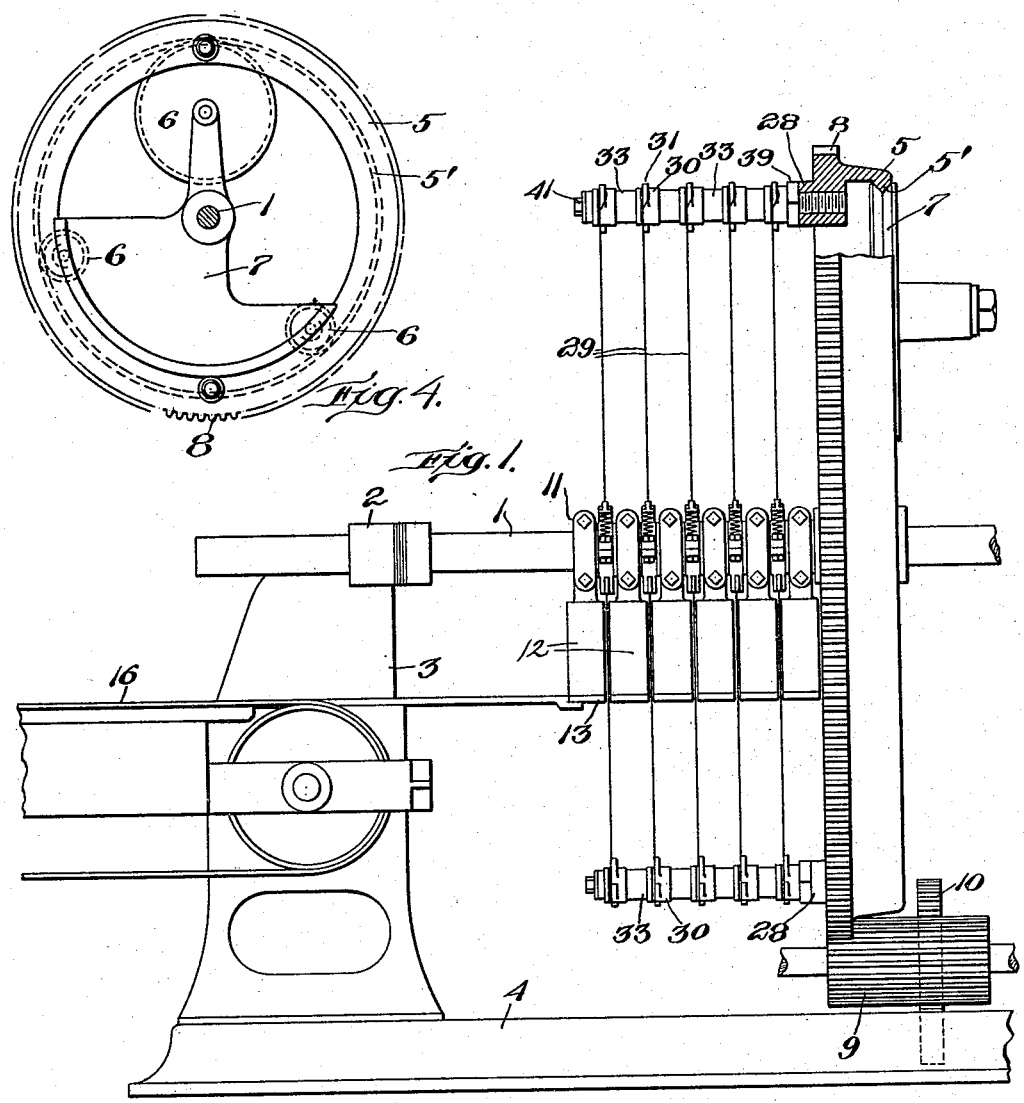

D. BROWN.
BRICK AND TILE CUTTING MACHINE.
APPLICATION FILED DEC. 18, 1912.
1,166,409.
Patented Dec. 28, 1915.
2 SHEETS—SHEET 2.
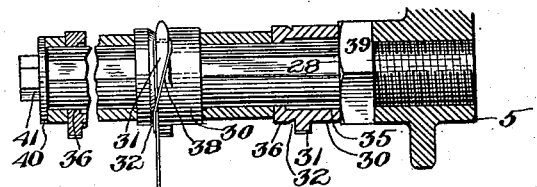
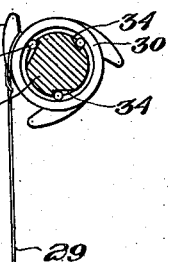
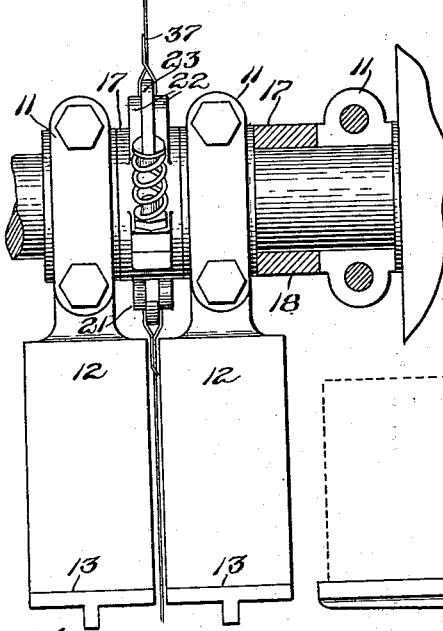
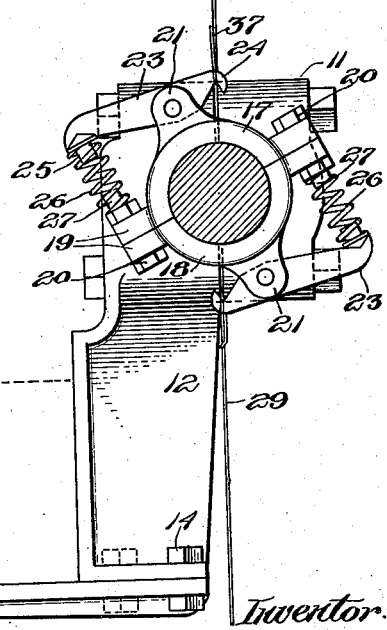
Fig. 2.  Fig. 3.
Witnesses:
Edward Maxwell
James R. Hodder
Inventor:
Davis Brown,
by Geo. W. Maxwell, atty.

ized Kingdom# UNITED STATES PATENT OFFICE.

DAVIS BROWN, OF BUCYRUS, OHIO, ASSIGNOR TO AMERICAN CLAY MACHINERY COMPANY, A CORPORATION OF OHIO.

BRICK AND TILE CUTTING MACHINE.

1,166,409.      Specification of Letters Patent.    Patented Dec. 28, 1915.

Application filed December 18, 1912. Serial No. 737,396.

*To all whom it may concern:*

Be it known that I, DAVIS BROWN, a citizen of the United States, and resident of Bucyrus, county of Crawford, State of Ohio, have invented an Improvement in Brick and Tile Cutting Machines, of which the following description, in connection with the accompanying drawings, is a specification, like letters on the drawings representing like parts.

This invention relates to brick and tile cutting machines and more particularly to the wire cutting reel therefor.

In machines to cut clay into uniform thicknesses or lengths, of the type shown in the patent to W. R. Cunningham, No. 775,800, it is of great importance to have the various cutting wires which constitute the operating portion of the reel to cut the clay, held under a yielding tension and arranged to be easily, quickly, and readily adjusted to tighten such tension.

It is an object of this invention to provide an improved cutting reel, and to provide a more efficient method of holding the wires on said reel than heretofore.

Other objects of the invention are to provide means to hold each cutting wire under a yielding tension which will be capable of adjustment to increase the tension exerted on each wire independently of that on the other wires and reels; and to provide wire holding devices on which the cutting wires may be quickly attached when worn out or broken.

Further objects of the invention, novel combinations of parts and details of construction will be hereinafter more distinctly pointed out and claimed.

Referring to the drawings, wherein a preferred embodiment of the invention is illustrated as applied to a machine such as is shown in the Cunningham patent above referred to, Figure 1 is a view, in elevation, of the reel holding the cutting wires; Fig. 2 is an enlarged detail view, partly in cross section, of the novel wire ring on the central shaft of the reel and of the self-gripping wire holder on each of the bars; Fig. 3 is a cross sectional view transversely of the longitudinal shaft and wire bars; and Fig. 4 is a view showing the mounting for the wire holding reel.

The usual longitudinal shaft of a brick and tile cutting machine of the type illustrated in the Cunningham patent is shown at 1, which shaft is mounted in suitable bearings so that it may slide longitudinally therein, one of said bearings 2 being on a bracket 3, formed on a suitable pedestal 4. The wire carrying reel comprises a rim or wheel 5 mounted concentrically with the longitudinal shaft 1 and having an internal flange 5' arranged to run on grooved wheels 6 carried by a spider 7 secured to the shaft. The rim 5 has peripheral gear teeth 8 arranged to be in mesh with a correspondingly geared pinion or drum 9, which drum is suitably actuated by a gear 10 carried by a shaft connected with the source of power (not shown) of the machine. The pinion 9 is of sufficient length so that as the longitudinal shaft 1 is reciprocated lengthwise in its bearings carrying the spider 7 and rim 5 with it, the teeth 8 of the rim 5 will at all times be in mesh with the pinion 9, and be actuated thereby. Rigidly secured to the longitudinal shaft 1 are a plurality of split hangers 11, suitably clamped about said shaft, eliminating the use of set screws or the like, as in former constructions, and carrying the usual push boards 12 and platens 13. These push boards and platens are of the usual width for the thickness of the clay desired to be cut, the push boards being formed rigid with the hangers 11, and the platens being suitably bolted thereto by bolts 14, as shown in Fig. 3. These platens support and carry the column of clay 15, which is fed to the cutting reel from the forming die in the usual manner, and as shown in said patent, the off-bearing belt being shown at 16.

Instead of the ordinary wire ring to encircle the longitudinal shaft 1 and to hold the inner ends of the cutting wires, I employ a novel form of holder, comprising a collar formed in two parts 17 and 18, each part having suitable ears 19 through which bolts 20 pass to secure the collar about the shaft 1, so that said collar may turn freely upon the shaft. Secured to each of the collar sections 17 and 18 are projecting lugs 21 in which are pivoted at 22 short levers 23. These levers are provided at one end with a wire engaging hook 24 and at the other end with a boss 25 to receive the encircling end portion of a coiled spring 26. Each lever 23 is preferably of a suitable length so that the outer end carrying the boss 25 is substantially vertically over the ears 19 and the bolt 20 connecting said ears may conveniently be made of sufficient length so that its projecting portion 27 will act to engage and hold the lower end of the spring 26, as clearly shown in Fig. 3. The construction just described is similar for each of the levers 23, the wire carrying end being preferably shorter than that engaged by the spring 26, so that a considerable leverage may be secured on the hook end and a comparatively light spring be employed. This arrangement also permits the path of movement of the wire carrying hook to be concentric with the axis of the shaft 1, around which the collars are freely rotated by the action of the cutting wires. The collars 17 and hangers 11 are of appropriate width so that the hooked ends 24 of the levers 23 will be in proper intermediate position to lead the cutting wires through the spaces left between the push boards 12 and platens 13, as will be readily understood.

The rim 5 has threaded sockets about its periphery, to carry wire bars 28, each bar being suitably threaded to fit such sockets, as indicated in Fig. 2. A plurality of these wire bars consistent with the action of the cutting reel may be carried, two such bars being herein shown. These bars are arranged to carry the outer ends of the cutting wires 29. As the wire holding means upon the bars 28 are identical, a description of one will be sufficient for all. The bar 28 is of sufficient and appropriate length to carry as many cutting wires 29 as may be suitable for the machine in which they are employed. The wire holding means comprises a wire ring, sleeve, or clutch 30, having formed on the outer side thereof a plurality of wire engaging hooks 31, said hooks being formed substantially in the same plane and at appropriate points around the circumference of the sleeve 30. Adjacent to the several wire holding hooks 31 is formed a continuous groove 32 in the periphery of the sleeve 30, so that as the looped end of a cutting wire 29 is looped over any one of the hooks 31, and the holding clutch 30 rotated to tighten the wire, said wire will lead into the adjacent groove 32 and therefore hold said wire at a uniform pulling position on the clutch 30. This groove is in the same vertical plane with that of the corresponding lever 23 and thereby the cutting wire 29 is held in a true position so that as the rim 5 is rotated and the bars 28 are rotated with it, each cutting wire 29 will be swung successively through the corresponding openings between the push boards and platens to cut the column 15 of clay. The several clutch members 30 are held apart in proper spaced relation corresponding with that of the passages between the push boards and platens 12 and 13, by means of loose sleeves 33, mounted on each bar between the wire holding clutches 30. These wire holding clutches are preferably so formed that they may be easily and readily rotated in one direction only, and to catch or hold automatically against movement in a reverse direction at any point. Preferably I employ a suitable form of "Horton" clutch, cutting a plurality of planes 34 directly in the bar 28 and fitting therein suitable rollers 29. These planes are so formed that as the clutch 30 is rotated from left to right, viewing Fig. 3, the rollers 29 will be moved toward the deeper part of the planes and thus afford a clearance for the clutch 30, while any movement of the member 30 in reverse direction will at once catch and bind the rollers 29 in the narrow portion of the planes 34 in a well known manner. In order to hold the rollers 35 in proper lengthwise relation, I prefer to form each wire holding clutch 30 with an inwardly extending flange 36, which prevents the rollers 35 from moving in one direction, while the spacing sleeves 33 will prevent said rollers moving in the reverse direction, the inner diameter of the clutch 30 being sufficient to afford a substantial clearance over the diameter of the bar 28, and the thickness of the spacing sleeves 33 being greater than the extent of clearance just mentioned, so that the entire clutch arrangement on each bar is closed and protected.

The operation of the wire holding device is simple and efficient. The wires 29 are usually provided of approximately correct length for the distance between the wire holder on the shaft 1 and the bar 28, and each end of the wire is provided with loops 37, 38. One loop being caught over the hook end 24 of a lever 23 and the other loop 38 is caught over any one of the hooks 31 on the clutch 30, corresponding in position to that of the lever 23 just mentioned. The clutch 30 is rotated by the operator from left to right to tighten the wire 29 and to render it taut or tightly stretched between the lever 23, and the hook 31 on which it is caught. As soon as the wire is stretched tight, the outer end of the lever 23 will compress the spring 26 and a spring tension will thus be put upon the wire. Any degree of tension desired within the limit of compression of the spring 26 may be put upon the wire 29 by continued tightening manipulation of the clutch 30, the rolls 35 of said clutch instantly holding it in the position to which it has been rotated as soon as released by the operator. This enables a broken wire to be quickly and instantly replaced by the operator in a very expeditious manner with a minimum stoppage of the cutting reel. Also it enables the tension of any wire to be increased, should it have become slackened in the operation of the machine. In order to release the wires, the springs 26 may be compressed beyond the tension which they normally exert and the loop 37 of a wire at once released. This construction affords a very quick attachable or detachable means for holding each wire independently of all the other wires of the reel. The springs 26 also act as an automatic tension equalizing means upon the wires, should the operator tighten the respective clutches 30 to a different degree, yet the springs 26 will always exert a substantially equal tension upon the wires, within a reasonable limit of compression. It will be understood that in the operation of the cutting reel a further tension is exerted upon the wires 29 as the bars 28 are carried along by the rim 5, the wires 29 will be the means of pulling or dragging the collars 17 and 18 around the longitudinal shaft 1, so that a somewhat increased tension will be exerted. In order to hold the various rings 30 and spacing sleeves 33 on each wire bar 29 a washer 40 is provided on the outer end of each wire bar, which may be clamped to the bar by a headed screw 41 threaded into a correspondingly threaded socket in the outer end of the iron bar.

It will thus be seen that I have provided a wire holder for this type of cutting reel which constantly exerts a spring tension upon the cutting wire and which is capable of a quick adjustment of such tension on any wire, individually and independently. Also suitable means, in the form of the groove 32, is provided whereby the wire 29 is always led from the same relative position on the ring or clutch 30, irrespective of the rotation of said ring to tighten the wire and increase the tension thereon. The construction whereby a self-gripping wire holder or clutch is provided, to automatically hold the wire in whatever position it may have been adjusted by the operator, is a special feature of great practical importance. I have also provided an efficient form of hangers for the push boards and platens, obviating the former necessity for the use of set screws or the like, and clamping the hangers on to the longitudinal shaft solidly and rigidly at the same time they are assembled on to the shaft.

Having described my invention, what I claim as new and desire to secure by Letters Patent is:

1. In a brick and tile cutting machine, a plurality of cutting wires to cut a stream of brick material, means to hold said wires under tension, comprising spring holding means for one end of the wire, an adjustable clutch rotatable on a supporting spindle for the other end of the wire, said clutch having a plurality of selective wire engaging devices thereon, and means coöperative with each of said wire engaging devices to hold the wire in the same relative position, irrespective of the adjustment of said clutch, by rotation about its spindle.

2. In a brick and tile cutting machine, a cutting reel carrying a plurality of cutting wires, said reel comprising a wheel mounted concentrically with a longitudinal shaft, a wire bar secured to the wheel near its rim and extending parallel with the longitudinal shaft, means to hold one end of each wire upon the longitudinal shaft, means to hold the other end of each wire on the wire bar, comprising a sleeve rotatable on said bar, and automatic means permitting the sleeve to be rotated in one direction to tighten the tension on the wire and to prevent its rotation in the reverse direction, while maintaining said wire constantly in the same radial position.

3. In a brick and tile cutting machine, a cutting reel carrying a plurality of cutting wires, said reel comprising a wheel mounted concentrically with a longitudinal shaft, a wire bar secured to the wheel near its rim and extending parallel with the longitudinal shaft, means to hold one end of each wire upon the longitudinal shaft, means to hold the other end of each wire on the wire bar, comprising a sleeve rotatable on said bar, said sleeve having a plurality of wire engaging devices and a groove adjacent each device to hold the wire in the same relative position on the sleeve, irrespective of which wire engaging device the wire is secured to.

In testimony whereof, I have signed my name to this specification, in the presence of two subscribing witnesses.

DAVIS BROWN.

Witnesses:
J. T. DE LASHMUTT,
M. E. WAGNER.

Copies of this patent may be obtained for five cents each, by addressing the "Commissioner of Patents Washington, D. C."